(12) United States Patent
Taylor

(10) Patent No.: US 7,573,112 B2
(45) Date of Patent: Aug. 11, 2009

(54) METHODS AND APPARATUS FOR SENSOR HAVING CAPACITOR ON CHIP

(75) Inventor: William P. Taylor, Amherst, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 0 days.

(21) Appl. No.: 11/279,780

(22) Filed: Apr. 14, 2006

(65) Prior Publication Data

US 2007/0243705 A1    Oct. 18, 2007

(51) Int. Cl.
  H01L 29/82    (2006.01)
  H01L 43/00    (2006.01)
(52) U.S. Cl. ............ 257/427; 257/535; 257/E29.167
(58) Field of Classification Search .......... 257/420, 257/427, E29.167, E29.323, 535
See application file for complete search history.

(56) References Cited

U.S. PATENT DOCUMENTS

| | | | |
|---|---|---|---|
| 4,409,608 A | 10/1983 | Yoder | |
| 5,244,834 A | 9/1993 | Suzuki et al. | |
| 6,396,712 B1 | 5/2002 | Kuijk | |
| 6,429,652 B1* | 8/2002 | Allen et al. | 324/259 |
| 6,798,057 B2 | 9/2004 | Bolkin et al. | |
| 6,812,687 B1 | 11/2004 | Ohtsuka | |
| 6,921,955 B2 | 7/2005 | Goto | |
| 7,075,287 B1 | 7/2006 | Mangtani et al. | |
| 7,166,807 B2 | 1/2007 | Gagnon et al. | |
| 7,259,624 B2* | 8/2007 | Barnett | 330/252 |
| 7,358,724 B2 | 4/2008 | Taylor et al. | |
| 7,476,816 B2 | 1/2009 | Doogue et al. | |
| 7,476,953 B2 | 1/2009 | Taylor et al. | |
| 2002/0027488 A1 | 3/2002 | Hayat-Dawoodi et al. | |
| 2004/0135220 A1 | 7/2004 | Goto | |
| 2004/0207035 A1 | 10/2004 | Witcraft et al. | |
| 2005/0151448 A1* | 7/2005 | Hikida et al. | 310/338 |
| 2005/0253507 A1* | 11/2005 | Fujimura et al. | 313/506 |

(Continued)

FOREIGN PATENT DOCUMENTS

DE    40 31 460 A1    4/1992

(Continued)

OTHER PUBLICATIONS

Mario Motz, Dieter Draxelmayr, Tobias Werth & Bernhard Forster, A Chopped Hall Sensor With Small Jitter and Programmable "True Power-On" Function, IEEE Journal of Solid-State Circuits vol. 40 No. 7 Jul. 2005 pp. 1533-1540.

(Continued)

Primary Examiner—Ngan Ngo
(74) Attorney, Agent, or Firm—Daly, Crowley, Mofford & Durkee, LLP

(57) ABSTRACT

A magnetic sensor comprises a plurality of layers including a substrate having circuitry, at least one conductive layer to interconnect the circuitry, and an insulator layer to electrically insulate the at least one conductive layer. First and second conductive layers are disposed above the substrate with a dielectric layer disposed between the first and second conductive layers such that the first and second conductive layers and the dielectric layer form a capacitor. A first terminal is electrically connected to the first conductive layer and a second terminal is electrically connected to the second conductive layer.

1 Claim, 6 Drawing Sheets

U.S. PATENT DOCUMENTS

| | | | |
|---|---|---|---|
| 2005/0274982 A1 | 12/2005 | Ueda et al. | |
| 2006/0077598 A1 | 4/2006 | Taylor et al. | |
| 2006/0267135 A1 | 11/2006 | Wolfgang et al. | |
| 2007/0018642 A1* | 1/2007 | Ao ............................ | 324/252 |
| 2007/0138651 A1 | 6/2007 | Hauenstein | |
| 2007/0170533 A1 | 7/2007 | Doogue et al. | |

FOREIGN PATENT DOCUMENTS

| | | |
|---|---|---|
| WO | WO 01/74139 A2 | 10/2001 |
| WO | WO 01/074139 A3 | 10/2001 |
| WO | WO 2005/013363 A2 | 2/2005 |
| WO | WO 2005/013363 A3 | 2/2005 |

OTHER PUBLICATIONS

Infineon Technologies, Differential Two-Wire Hall Effect Sensor-IC for Wheel Speed Applications with Direction Detection, Feb. 2005, pp. 1-32, vol. 3.1

Infineon Technologies, Smart Hall Effect Sensor for Camshaft Applications, 2003, pp. 1-2.

Allegro Microsystems, Inc., Dynamic Self-Calibrating Peak-Detecting Differential Hall Effect Gear Tooth Sensor, pp. 1-14, Worcester, Massachusetts, date is not available.

Allegro Microsystems, Inc., Hall-Effect IC Applications Guide, pp. 1-34, date is not available.

Allegro Microsystems, Inc., Dynamic Self-Calibrating Peak-Detecting Differential Hall Effect Gear Tooth Sensor, Mar. 22, 2006, pp. 1-2.

Allegro Microsystems, Inc., Two-Wire True Zero-Speed Miniature Differential Peak-Detecting Sensor with Continuous Calibration, pp. 1-13, date is not available.

Allegro Microsystems, Inc., Two-Wire True Zero-Speed Miniature Differential Peak-Detecting Sensor with Continuous Calibration, Mar. 22, 2006, pp. 1-2.

Gagnon; "Current Sensor" U.S. Appl. No. 11/144,970, filed Jun. 3, 2005.

Mangtani; "Current Sensor" U.S. Appl. No. 11/336,602, filed Nov. 10, 2006.

Doogue; "Current Sensor" U.S. Appl. No. 11/401,160, filed Apr. 10, 2006.

Taylor; "Current Sensor" U.S. Appl. No. 11/383,021, filed May 12, 2006.

Taylor; "Integrated Sensor Having A Magnetic Flux Concentrator" U.S. Appl. No. 11/051,124, filed Feb. 4, 2005.

Taylor; "Resistor Having A Predetermined Temperature Coefficient" U.S. Appl. No. 10/962,889, filed Oct. 12, 2004.

Doogue; "Arrangements For An Integrated Sensor" U.S. Appl. No. 11/335,944, filed Jan. 20, 2006.

Taylor; "Integrated Magnetic Flux Concentrator" U.S. Appl. No. 11/129,933, filed May 16, 2005.

Notification of transmittal of the International Search Report and the Written Opinion of the International Searching Authority, or the Declaration dated Oct. 23, 2007 (Form PCT/ISA/220). International Search Report. (Form PCT/ISA/210). Written Opinion of the International Searching Authority (Form PCT/ISA/237).

Second and Supplementary Notice Information the Applicant of The Communication of the International Application (To Designated Office Which Apply the 30 Month Time Limit Under Article 22(1) dated Aug. 14, 2008 (Form PCT/IB/308). (PCT/US2007/008920).

Notification Concerning Transmittal of Copy of International Preliminary Report on Patentability (Chapter I of the Patent Cooperation Treaty) dated Oct. 23, 2008 (PCT/US2007/008920).

File downloaded from PAIR for U.S. Appl. No. 11/554,619, filed Oct. 31, 2006, file through Feb. 9, 2009, 392 Pages.

File downloaded from PAIR for U.S. Appl. No. 11/877,144, filed Oct. 23, 2007, file through Feb. 9, 2009, 108 Pages.

File downloaded from PAIR for U.S. Appl. No. 11/877,100, filed Oct. 23, 2007, file through Feb. 9, 2009, 120 Pages.

* cited by examiner

METHODS AND APPARATUS FOR SENSOR HAVING CAPACITOR ON CHIP

CROSS-REFERENCE TO RELATED APPLICATIONS

Not applicable.

STATEMENT REGARDING FEDERALLY SPONSORED RESEARCH

Not Applicable.

BACKGROUND

As is known in the art, there are a variety of sensors that are useful for particular applications. For example, magnetic sensors are useful to detect movement, such as rotation, of an object of interest. Typically, Hall-effect sensors require a discrete decoupling capacitor component placed on or near the sensor to enhance EMC (Electromagnetic Compatibility) and reduce so-called long-wire noise problems. However, external capacitors incur added cost and processing at the individual device level. External capacitors also increase the total package size if the capacitor resides on the leadframe or requires an additional printed circuit board.

SUMMARY

The present invention provides a magnetic sensor including an on chip capacitor formed from first and second conductive layers and a dielectric layer disposed over a substrate. With this arrangement, the need for an external decoupling capacitor may be eliminated. While the invention is primarily shown and described in conjunction with particular layer stack ups, devices and configurations, it is understood that the invention is applicable to circuits in general in which it is desirable to provide a capacitive impedance.

In one aspect of the invention, a magnetic sensor comprises a plurality of layers including a substrate including circuitry, at least one conductive layer to interconnect the circuitry, and an insulator layer to electrically insulate the at least one conductive layer. First and second conductive layers are disposed above the substrate, and a dielectric layer is disposed between the first and second conductive layers such that the first and second conductive layers and the dielectric layer form a capacitor. The sensor further includes a first terminal electrically connected to the first conductive layer and a second terminal electrically connected to the second conductive layer.

In another aspect of the invention, a method includes forming a first conductive layer over a substrate containing circuitry, forming a dielectric layer over the first conductive layer, and, forming a second conductive layer over the dielectric layer such that the first conductive layer, the dielectric layer, and the second conductive layer form a first capacitor. A first terminal can be coupled to the first conductive layer and a second terminal can be coupled to the second conductive layer.

BRIEF DESCRIPTION OF THE DRAWINGS

The foregoing features of this invention, as well as the invention itself, may be more fully understood from the following description of the drawings in which.

DETAILED DESCRIPTION

Figure 1A:
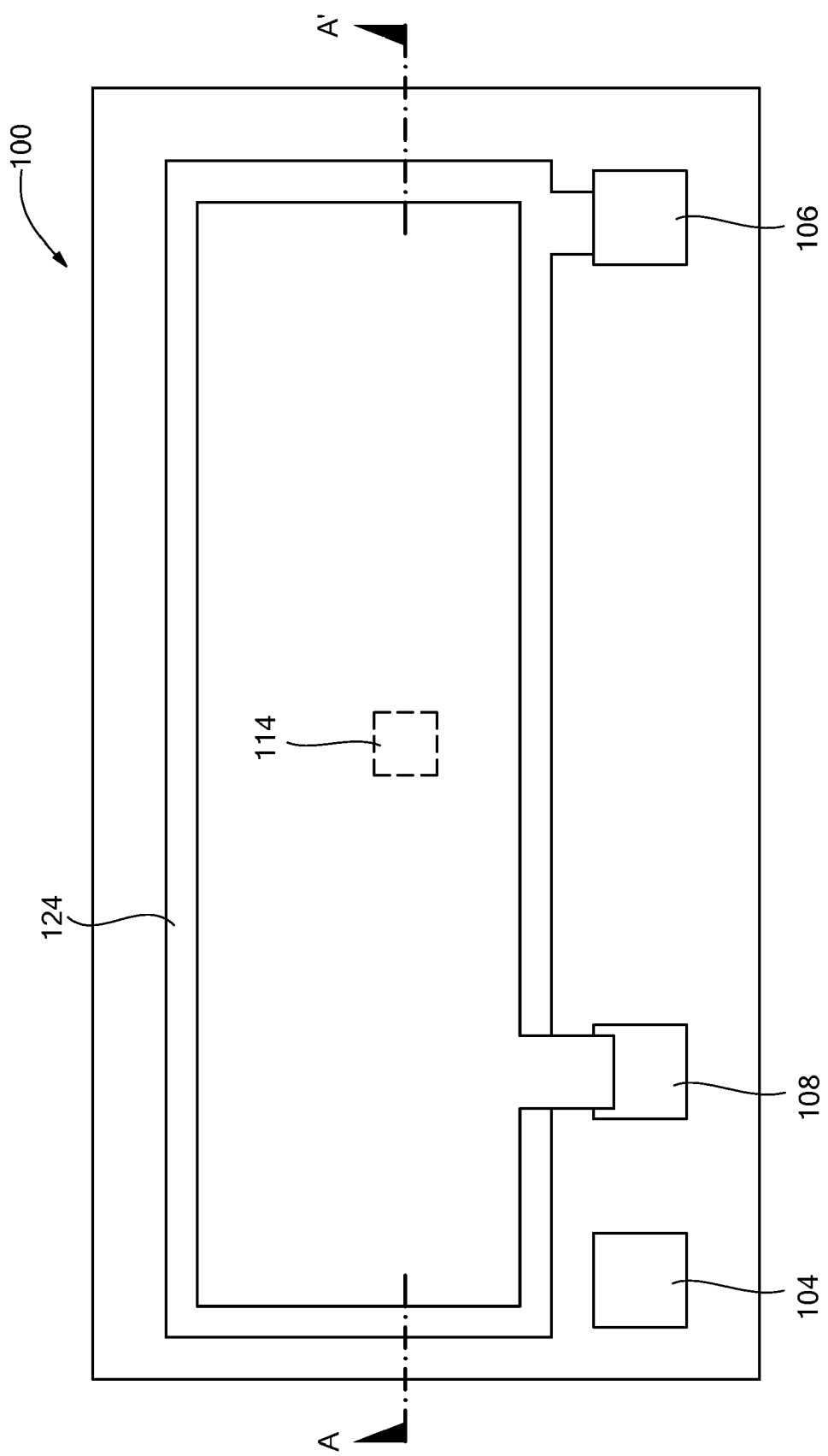
FIG. 1A is a top view of a sensor having an on chip capacitor in accordance with an exemplary embodiment of the invention.
Figure 1B:
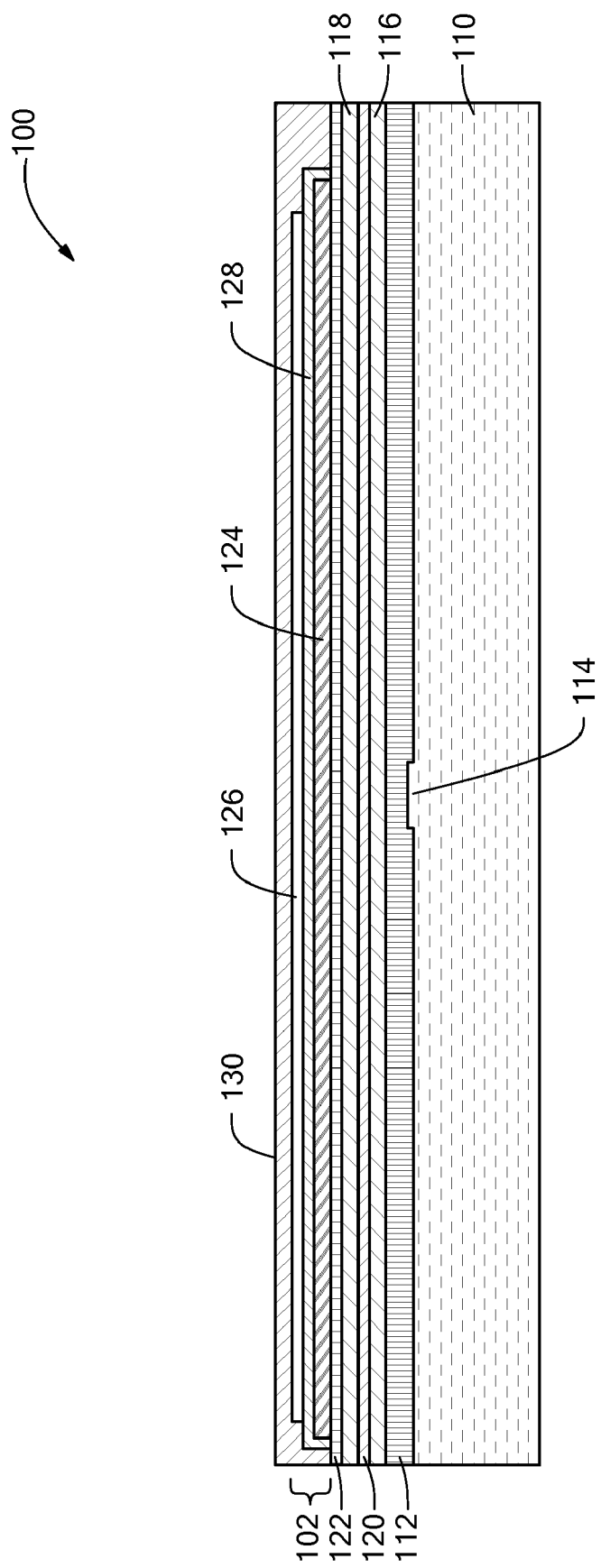
FIG. 1B is a cross-sectional view of the sensor of FIG. 1A taken along line A-A.

FIGS. 1A-B show an exemplary embodiment of a magnetic sensor 100 embodiment having an on chip capacitor 102 in accordance with the present invention. In the illustrated embodiment, the sensor 100 is a two-wire Hall effect type sensor having a VCC terminal 104 and a ground terminal 106. The capacitor 102 can be provided as a decoupling capacitor coupled between the VCC terminal 104 and the ground terminal 106, for example. As described more fully below, the capacitor 102 can be coupled to a VCC cap terminal 108, which is at the same potential as the VCC terminal 104 in an exemplary embodiment. The VCC cap terminal 108 and the VCC terminal 104 can be electrically coupled using any suitable technique, such as wire bonding. This arrangement allows breakdown testing. In alternative embodiments, Vcc and Vcc cap bond pads could be combined to form a single pad.

A first metal layer 116 is disposed on the substrate 110 and an optional second layer 118, which is sandwiched between first and second insulating layers 120, 122, is disposed over the first metal layer 116. The first and second metal layers 116, 118 provide, for example, interconnection and routing for the device layer 112. The first and second insulating layers 120, 122 can be provided, for example, as interlayer dielectric and/or passivation layers.

First and second conductive layers 124, 126 are separated by a dielectric material 128 to form the on chip capacitor 102 above the substrate. The capacitor 102 is covered by a further insulating layer 130. In an exemplary embodiment, the capacitor 102 is separated, and electrically isolated, from the second metal layer 118 by the second insulating layer 122.

In an exemplary embodiment, a substrate 110, e.g., silicon, includes an integrated circuit (IC) in layers 112, 116, 120, 118, and/or 122 in which circuitry is formed in a manner well known to one of ordinary skill in the art. The device layer 112 can include a Hall element 114 that forms part of the magnetic sensor 100. The device layer may include various layers necessary to form an integrated circuit, including, but not limited to, implant or doped layers, polysilicon, epi layers, oxide, or nitride layers.

While a particular layer stack up is shown and described, it is understood that other embodiments having different layering orders and greater and fewer metal and other layers are within the scope of the invention. In addition, additional conductive layers can be added to form additional capacitors to meet the needs of a particular application.

Figure 2B:
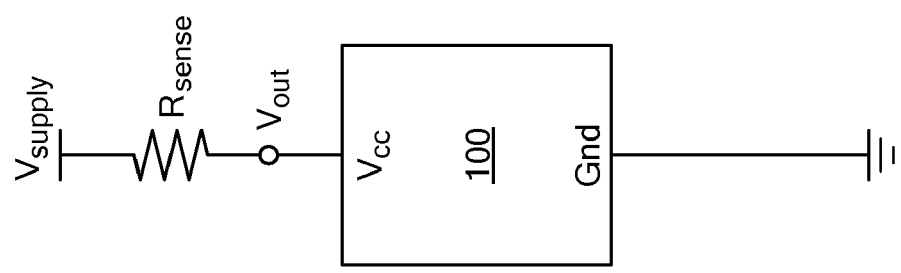
FIGS. 2A and 2B show a two-wire magnetic sensor having an on chip capacitor.
Figure 2A:
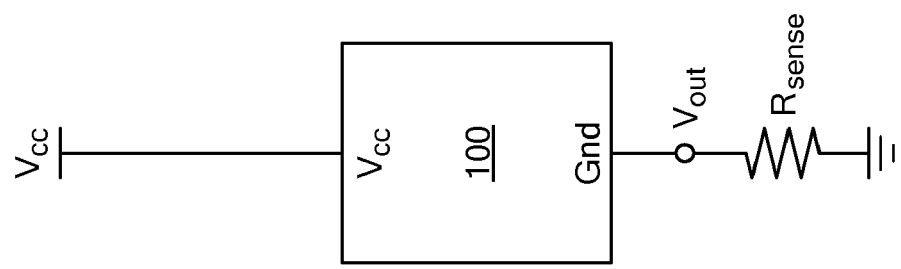

As shown in FIG. 2A, for the illustrated two-wire sensor, a sense resistor Rsense can be coupled between the ground terminal 106 and a ground connection, or as shown in FIG. 2B, the sense resistor Rsense can be coupled between the VCC terminal 104 and the power supply. This enables measurement of the sensor 100 output in the form of current changes in response to a positional displacement of a magnetic object of interest. By providing an on chip capacitor, the need for an external decoupling capacitor for the sensor may be eliminated.

Figure 3:
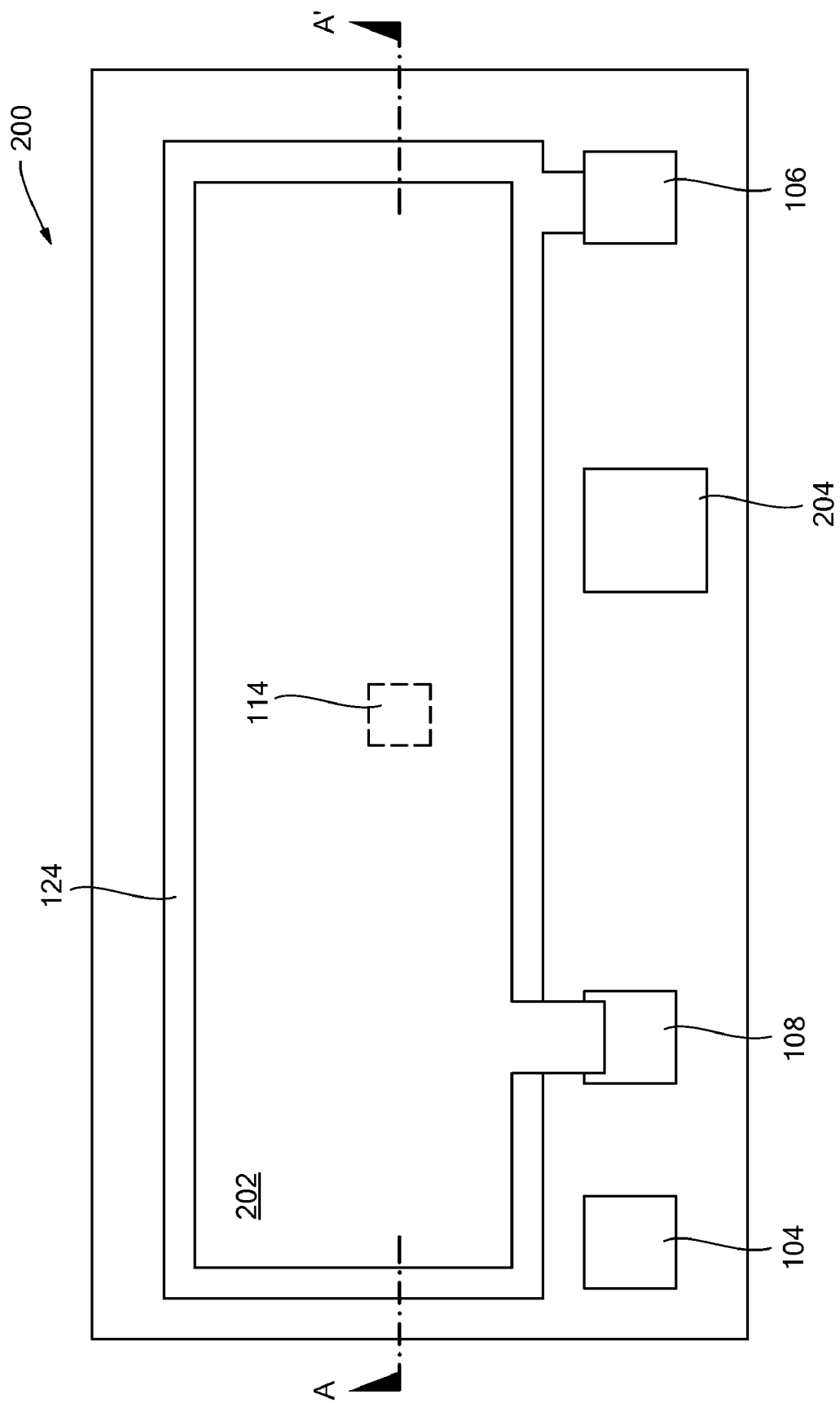
FIG. 3 is a pictorial top view of a three-wire magnetic sensor having an on chip capacitor.

In another embodiment shown in FIG. 3, a three-wire magnetic sensor 200 includes an on chip capacitor 202 with a Vout terminal 204 to provide a sensor output signal. The sensor 200 of FIG. 3 has some similarity with the sensor 100 of FIGS. 1A-1C, where like reference numbers indicate like elements.

It is understood that higher breakdown voltage requirements for the capacitor may limit the amount of capacitance that can be provided by the on chip capacitor. Lower breakdown voltage requirements may increase the amount of capacitance that can be provided. Factors that determine the characteristics of the on chip capacitor 102 include, for example, die size, metal layer area, conductive layer area, dielectric material, selected breakdown voltage, layer spacing, geometry, and others.

A variety of dielectric materials for the capacitor 102 can be used including, but not limited to; silicon nitride, silicon oxide, e.g. silicon dioxide, Tantalum oxide, Aluminum oxide, ceramics, glass, mica, polyesters (eg. Mylar), KAPTON, polyimides (e.g. Pyralin by HD Microsystems), benzocyclobutene (BCB, e.g. Cyclotene by Dow Chemical), and polynorbornene (e.g., Avatrel by Promerus). Inorganic dielectrics may be preferable for some applications based on their higher dielectric constant and the ability to create uniform thin films in the sub-micron range; e.g. 3,000 to 5,000 Angstroms in thickness.

These same dielectrics may be used where appropriate for interlayer dielectric, or final passivation materials. In the case of the interlayer dielectric, it may be advantageous to select a material that planarizes well, and has a low dielectric constant for use between the second metal layer 118 and the conductive layer 124. This should reduce any unwanted coupling of signals from lines on the metal layer 118 to the conductive layer 124, which may, for example, be a ground plane.

A variety of suitable materials can be used to provide the device layer for the sensor including silicon, gallium arsenide, silicon on insulator (SOI), and the like. In addition, various materials can be used to provide the metal layers and the conductive layers, which form the capacitor. Exemplary metal and conductive layer materials include copper, aluminum, alloys and/or other suitable metals.

In general, for a die size of about 2.5 to 3 mm$^2$, the on chip capacitor provides in the order of 400 pF. For a larger die, e.g., about 5 mm$^2$, the capacitor provides in the order of 800 pF. In exemplary embodiments, the capacitor provides a capacitance from about 100 pF to about 1,500 pF for a substrate ranging in size from about 1 mm$^2$ to about 10 mm$^2$.

In one particular embodiment, the first and second conductive layers 124, 126 (FIG. 1B) have dimensions of 2.3 mm$^2$. The dielectric material is silicon nitride having a thickness ranging of approximately 3,000 Å to about 5,000 Å. This arrangement provides a breakdown voltage of about at least 50V with a capacitance of about 300 pF to about 500 pF.

A Hall sensor having an on chip capacitor of about 100 pF to about 1,500 pF and at least 50V breakdown voltage is well suited for many vehicle applications, such as anti-lock brake sensors (ABS), linear position sensors, angle sensors, transmission sensors, cam sensors, and crank sensors.

In general, the first and second conductive layers 124, 126 (FIG. 1B) forming the capacitor 102 cover from about thirty percent to about ninety percent of the die area. The capacitor 102 may be above the die where above refers to some degree of overlap between generally parallel planes formed by the die and the conductive layers of the capacitor.

In one embodiment, the first and second layers cover an area of about eighty percent of the die area. Such a capacitor would provide a capacitance on the order of 400 pF, which can provide additional EMC protection to the circuitry on the die. In some devices, in the order of 200 pF may be sufficient for EMC or long-wire protection. In such a case the area required by the capacitor is not as large, and may be on the order of fifty percent of the total die area. In general, the capacitor can be sized to meet the needs of a particular application.

As used herein, the term die refers to a substrate, which may be a semiconductor or a semiconductor layer on an insulator, for example SOI substrates, with its associated circuits or electronic device elements. The circuits on the die may include semiconductor devices, for example diodes, and transistors, and passive devices, for example a resistor, inductor, or capacitor.

Figure 4:
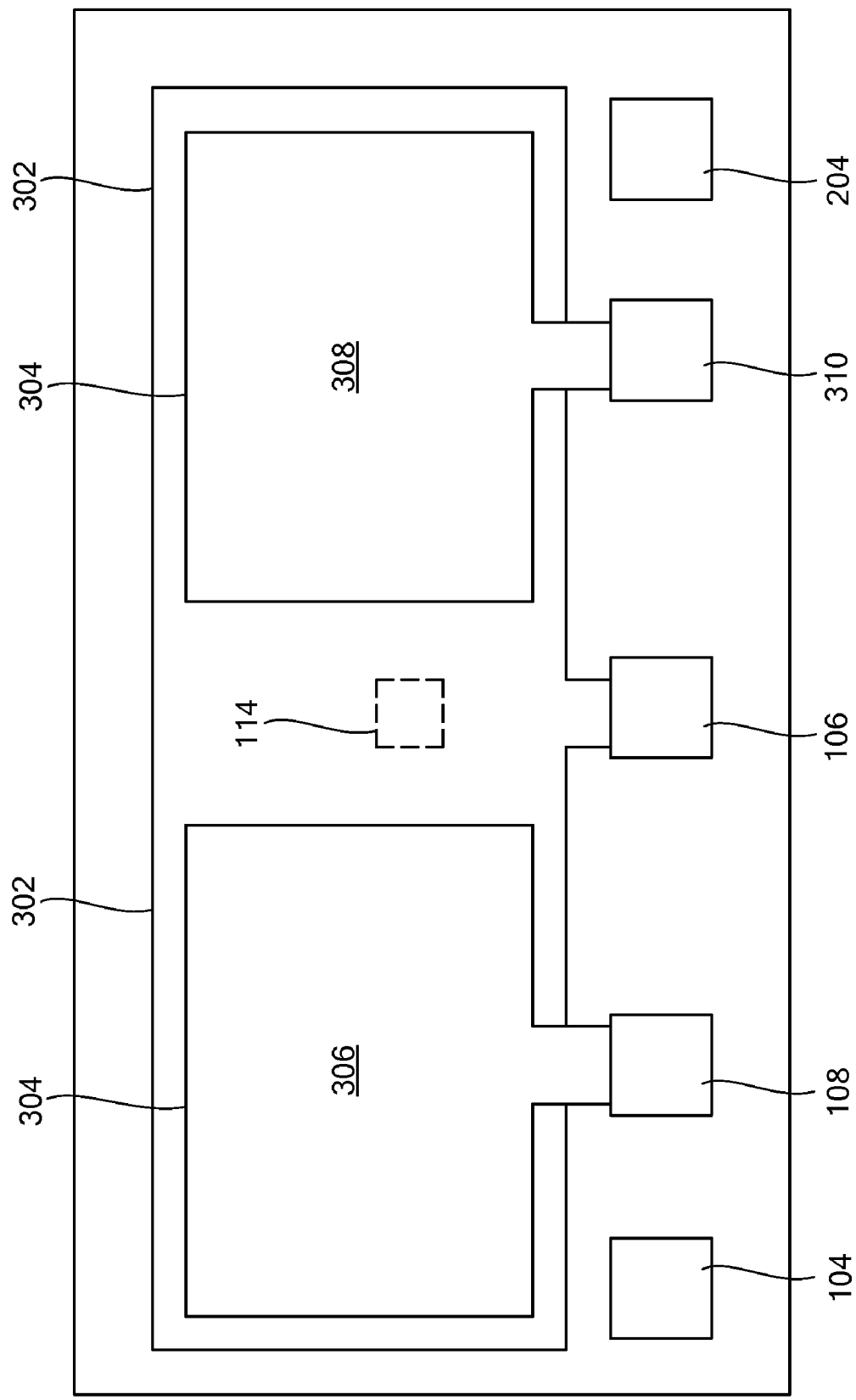
FIG. 4 is a schematic diagram of a sensor having multiple on chip capacitors.

As shown in FIG. 4, the second conductive layer 304 can be separated to form multiple capacitors, shown as first and second capacitors 306, 308 provided the first conductive layer 302 is at the same potential for both. It would also be apparent that the first conductive layer 302 could also be split to form separate capacitors, although it may require the addition of a bonding pad depending on the application. The first capacitor 306 provides a decoupling capacitor between the VCC cap terminal 108 and ground 106. The second capacitor 308 is coupled between a Vout cap terminal 310 and ground 106. A Vout terminal 204, which can be coupled to the Vout cap terminal 310 via wire-bond, provides a sensor output signal for a three-wire magnetic sensor, for example.

It is understood that the apportionment of the first and second conductive layers 302, 304 can be made to achieve capacitance requirements for a particular application. In addition, the first and second conductive layers can be split to form any practical number of capacitors above the die. Such multiple capacitor configurations may be useful for applications that require more than two-wires; for example a three-wire part with power, ground, and independent output pins.

Figure 5:
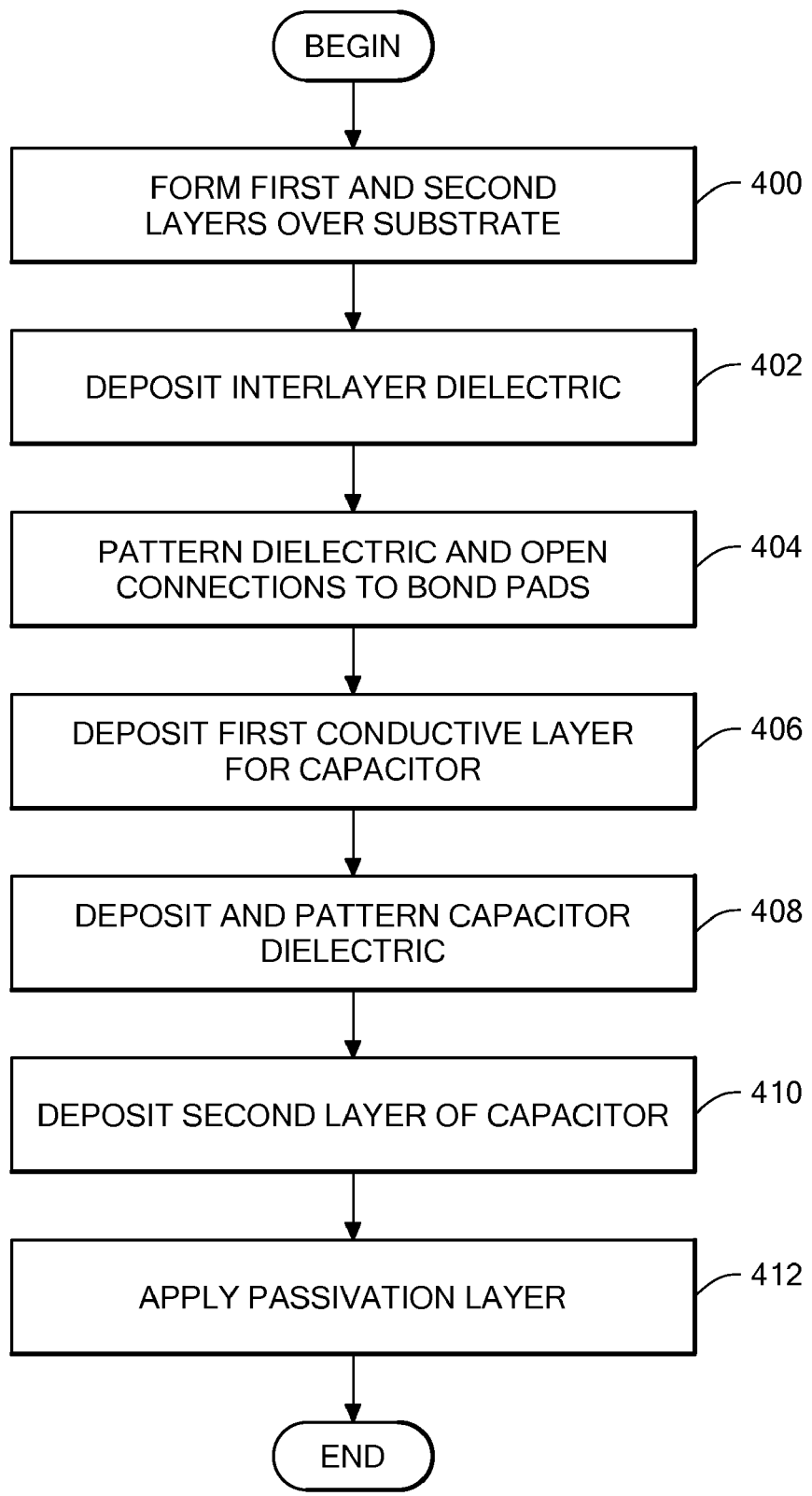
FIG. 5 is a flow diagram showing an exemplary sequence of steps to fabricate a sensor having an on chip capacitor.

FIG. 5 shows an exemplary sequence of steps to fabricate a sensor having an on-chip capacitor. In general, fabrication of the integrated capacitor is performed after an integrated circuit process is performed, which may also be referred to as the base process.

In step 400, first and second metal layers are formed over a substrate. In one particular embodiment, the base process includes two metal layers for interconnection and routing and a final passivation. It may be desirable to change the final passivation on the base process, which may typically include an oxide and nitride layer. After the second metal layer, in step 402 an interlayer dielectric is deposited. Again, this is the place where the final passivation would be performed in the base process. The interlayer dielectric can be an oxide, nitride, or organic dielectric such as a polyimide, or BCB. A material such as BCB has advantages in that it planarizes the underlying substrate well and allows a flat surface for the subsequent capacitor deposition. In step 404, the interlayer dielectric is then patterned to open connections to the bond pads in the underlying integrated circuit.

In step 406, a conductive layer is then deposited on the wafer and patterned to form one of the capacitor electrodes. In the illustrated embodiment, the lower capacitor electrode is connected to the ground bonding pad, but not any other portions of the underlying circuit. In some cases it may be desirable to have the lower capacitor layer on the other bonding pads of the integrated circuit, although these pads are not connected to the capacitor electrode. In step 408, the capacitor dielectric is deposited and patterned. The dielectric material may be silicon nitride, or other suitable material. In step 410, the second conductive layer of the capacitor is deposited on the wafer and patterned to form the top electrode of the capacitor. The upper layer of the capacitor may be connected to the Vcc pad of the integrated circuit, or it may be its own bonding pad. Having the upper layer of the capacitor as an independent pad allows the dielectric breakdown to be tested during the final test of the integrated circuit with an on-chip capacitor. In step 412, a final passivation layer is applied to the integrated circuit with the capacitor and pattern openings for the bonding pads.

It is understood that a variety of suitable fabrication processes can be used to form a sensor having an on chip capacitor including, but not limited to, bipolar, DMOS, bi-CMOS, CMOS, and processes and combinations of these and other processes While exemplary embodiments contained herein discuss the use of a Hall effect sensor, it would be apparent to one of ordinary skill in the art that other types of magnetic field sensors may also be used in place of or in combination with a Hall element. For example the device could use an anisotropic magnetoresistance (AMR) sensor and/or a Giant Magnetoresistance (GMR) sensor. In the case of GMR sensors, the GMR element is intended to cover the range of sensors comprised of multiple material stacks, for example: linear spin valves, a tunneling magnetoresistance (TMR), or a colossal magnetoresistance (CMR) sensor. In other embodiments, the sensor includes a back bias magnet.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A magnetic sensor, comprising:
    a substrate including circuitry;
    at least one conductive layer to interconnect the circuitry;
    an insulator layer to electrically insulate the at least one conductive layer;
    first and second conductive layers generally parallel to the substrate;
    a dielectric layer disposed between the first and second conductive layers such that the first and second conductive layers and the dielectric layer form a capacitor; and
    first and second terminals, wherein the first terminal is coupled to a voltage supply terminal and is electrically connected to the first conductive layer, and the second terminal is coupled to a ground terminal and is electrically connected to the second conductive layer, wherein the first conductive layer is separated to further comprise a third conductive layer electrically connected to a third terminal coupled to a voltage output terminal, and the dielectric layer is further disposed between the third and second conductive layers such that the third and second conductive layers and the dielectric layer form a second decoupling capacitor.

* * * * *